United States Patent
Tennent et al.

(10) Patent No.: US 8,954,278 B2
(45) Date of Patent: Feb. 10, 2015

(54) SPEED PROFILE DICTIONARY

(71) Applicant: Navteq B.V., Veldhoven (NL)

(72) Inventors: Toby S. Tennent, Chicago, IL (US); Michael L. Aper, Chicago, IL (US); Matthew G. Lindsay, San Jose, CA (US); Gary R. Rockwood, West Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/760,889

(22) Filed: Feb. 6, 2013

(65) Prior Publication Data

US 2013/0151152 A1 Jun. 13, 2013

Related U.S. Application Data

(63) Continuation of application No. 12/637,980, filed on Dec. 15, 2009, now Pat. No. 8,396,663.

(51) Int. Cl.
*G01C 21/34* (2006.01)
*G01C 21/32* (2006.01)

(52) U.S. Cl.
CPC ............ *G01C 21/3492* (2013.01); *G01C 21/32* (2013.01)
USPC .......................................... 701/540; 701/532

(58) Field of Classification Search
CPC ..... G01C 21/3492; G01C 21/32; H03M 7/40; B60I 8/00; H02K 1/141
USPC ......... 701/200, 532, 533, 549, 410, 414, 432, 701/540; 318/400.41
See application file for complete search history.

(56) References Cited

U.S. PATENT DOCUMENTS

| | | | |
|---|---|---|---|
| 8,396,663 B2* | 3/2013 | Tennent et al. | 701/532 |
| 2003/0158660 A1* | 8/2003 | Krull et al. | 701/209 |
| 2004/0064245 A1 | 4/2004 | Knockeart et al. | |
| 2005/0096842 A1 | 5/2005 | Tashiro | |
| 2005/0131631 A1* | 6/2005 | Nakano et al. | 701/200 |
| 2005/0184689 A1* | 8/2005 | Maslov et al. | 318/254 |
| 2007/0155404 A1 | 7/2007 | Yamane et al. | |
| 2009/0043499 A1* | 2/2009 | Endo et al. | 701/210 |
| 2009/0228196 A1 | 9/2009 | Raab | |

(Continued)

FOREIGN PATENT DOCUMENTS

| WO | WO 2009/053407 | 4/2009 |
|---|---|---|
| WO | WO 2009/053411 | 4/2009 |

OTHER PUBLICATIONS

J. MacQueen, Fifth Berkeley Symposium, Some Methods for Classification and Analysis of Multivariage Observations, pp. 281-297 (1967).

(Continued)

*Primary Examiner* — Tuan C. To
*Assistant Examiner* — Yuri Kan
(74) *Attorney, Agent, or Firm* — Lempia Summerfield Katz LLC

(57) ABSTRACT

A speed profile dictionary and associated lookup tables are disclosed. A set of distinct speed profiles is defined using a statistical analysis routine. Preferably, the statistical analysis routine uses clustering. The speed profiles are then matched to location codes identifying physical locations on a road network and days of the week. Applications using historic traffic data may use the speed profile dictionary and one or more lookup tables instead of a complete historic traffic database, thereby reducing the amount of memory needed to store historic traffic data.

20 Claims, 7 Drawing Sheets

(56) References Cited

U.S. PATENT DOCUMENTS

| | | |
|---|---|---|
| 2010/0114484 A1 | 5/2010 | Kida et al. |
| 2010/0235077 A1 | 9/2010 | Chan |
| 2010/0250127 A1 | 9/2010 | Hilbrandie et al. |
| 2010/0268456 A1 | 10/2010 | Kantarjiev et al. |
| 2010/0299055 A1* | 11/2010 | Hilbrandie et al. ........... 701/200 |
| 2011/0004397 A1 | 1/2011 | Nagase |
| 2011/0106416 A1 | 5/2011 | Scofield et al. |
| 2011/0112747 A1 | 5/2011 | Downs et al. |
| 2011/0153189 A1 | 6/2011 | Chiang et al. |
| 2012/0158301 A1* | 6/2012 | Schilling et al. .............. 701/533 |

OTHER PUBLICATIONS

A Tutorial on Clustering Algorithms, http://home.dei.polimi.it/matteucc/Clustering/tutorial_html/index.html, printed Oct. 29, 2009.

* cited by examiner

| CLUSTER | H00_00 | H00_15 | H00_30 | H00_45 | H01_00 | H01_15 | H01_30 | ... |
|---|---|---|---|---|---|---|---|---|
| 1 | 113 | 113 | 113 | 113 | 113 | 113 | 113 | ... |
| 2 | 113 | 113 | 113 | 113 | 113 | 113 | 113 | ... |
| 3 | 95 | 95 | 95 | 95 | 95 | 95 | 95 | ... |
| 4 | 97 | 97 | 97 | 97 | 97 | 97 | 97 | ... |
| 5 | 47 | 47 | 47 | 47 | 47 | 47 | 47 | ... |
| 6 | 79 | 79 | 79 | 79 | 79 | 79 | 79 | ... |
| 7 | 112 | 112 | 112 | 112 | 112 | 112 | 112 | ... |
| ... | ... | ... | ... | ... | ... | ... | ... | ... |

700

| TMC | SUN | MON | TUE | WED | THU | FRI | SAT |
|---|---|---|---|---|---|---|---|
| ... | ... | ... | ... | ... | ... | ... | ... |
| 5918 | 330 | 5 | 5 | 5 | 5 | 5 | 370 |
| 5919 | 331 | 331 | 331 | 331 | 331 | 331 | 331 |
| 5920 | 10 | 10 | 10 | 10 | 10 | 10 | 10 |
| 5921 | 262 | 458 | 458 | 262 | 262 | 262 | 458 |
| 5922 | 291 | 291 | 291 | 291 | 291 | 18 | 291 |
| 5923 | 18 | 18 | 18 | 18 | 18 | 319 | 18 |
| ... | ... | ... | ... | ... | ... | ... | ... |

SPEED PROFILE DICTIONARY

REFERENCE TO RELATED APPLICATIONS

This application is a continuation application of U.S. patent application Ser. No. 12/637,980, filed Dec. 15, 2009, now U.S. Pat. No. 8,396,663, the entire disclosure of which is hereby incorporated by reference.

FIELD

The present invention relates generally to historic traffic data, and more particularly, relates to a speed profile dictionary for representing historic speed data.

BACKGROUND

Historic traffic data for a roadway may include travel time, delay time, speed, and/or congestion data for various times of the day, days of the week, days of the year, and so on. The historic traffic data may be obtained from roadway sensors, probes, and/or incident reporting systems. The sensors may use radar, acoustics, video, and embedded loops in the roadway to collect data that can be used to characterize traffic conditions. For example, sensor data may include speed, volume (number of vehicles passing the sensor per period of time), and density (percentage of the roadway that is occupied by vehicles). The sensor data may include other data types as well, such as vehicle classification (e.g., car, truck, motorcycle).

Probe data is point data collected from a moving vehicle having a device that can identify vehicle position as a vehicle travels along a road network. For example, the device may use cellular technology (e.g., cell handover) or Global Positioning Satellite (GPS) technology to monitor the vehicle's position on the road network. By monitoring the vehicle's movement, the probe data can be used to determine travel time, which can then be used to calculate speed of the vehicle.

Incident data is traffic data regarding a traffic event that obstructs the flow of traffic on the road system or is otherwise noteworthy in reference to traffic. Example incidents include accidents, congestion, construction, disabled vehicles, and vehicle fires. A traffic operator may enter the incident data into a Traffic Incident Management System (TIMS), such as the TIMS described in U.S. Patent Publication No. 2004/0143385, which is assigned to the same assignee as the current application. The traffic operator is a person who gathers traffic information from a variety of sources, such as by monitoring emergency scanner frequencies; by viewing images from cameras located adjacent to a roadway; by calling government departments of transportation, police, and emergency services; and by obtaining information from aircraft flying over the road network.

The historic traffic data may be stored in a historic traffic database, such as NAVTEQ Traffic Patterns™ database, which includes typical traffic speeds for many primary and secondary roads. Data in the historic traffic database may be used in routing applications allowing drivers to plan routes that avoid typically congested areas and receive more accurate trip time estimates based on likely traffic conditions. The historic traffic data may also be used to predict clearance time for a traffic event; to predict traffic conditions when sensor data, probe data, and/or incident data is unavailable for a particular roadway; to predict the probability of accidents; or for any other suitable purpose.

While the historic traffic database has many beneficial uses, there are still opportunities for improvement. One area for improvement is in reducing the storage requirements for the historic traffic database. Because the volume of historic traffic data is so large, it would be beneficial to represent historic traffic data in a manner that minimizes storage requirements.

SUMMARY

A speed profile dictionary and associated lookup tables are disclosed. A set of distinct speed profiles is defined using a statistical analysis routine. Preferably, the statistical analysis routine uses clustering. Clustering is a statistical analysis technique that analyzes the distribution of data over multiple dimensions and attempts to organize the data into "like" groupings. The speed profiles are then matched to location codes identifying physical locations on a road network. The use of a speed profile dictionary may reduce storage requirements of a historic traffic database up to 98%. The speed profile dictionary may also be used to identify erroneous input data, which improves the consistency and quality of a historic traffic database.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 7 depicts a speed profile dictionary and a speed profile dictionary lookup table, according to an example.

DETAILED DESCRIPTION

Figure 1:
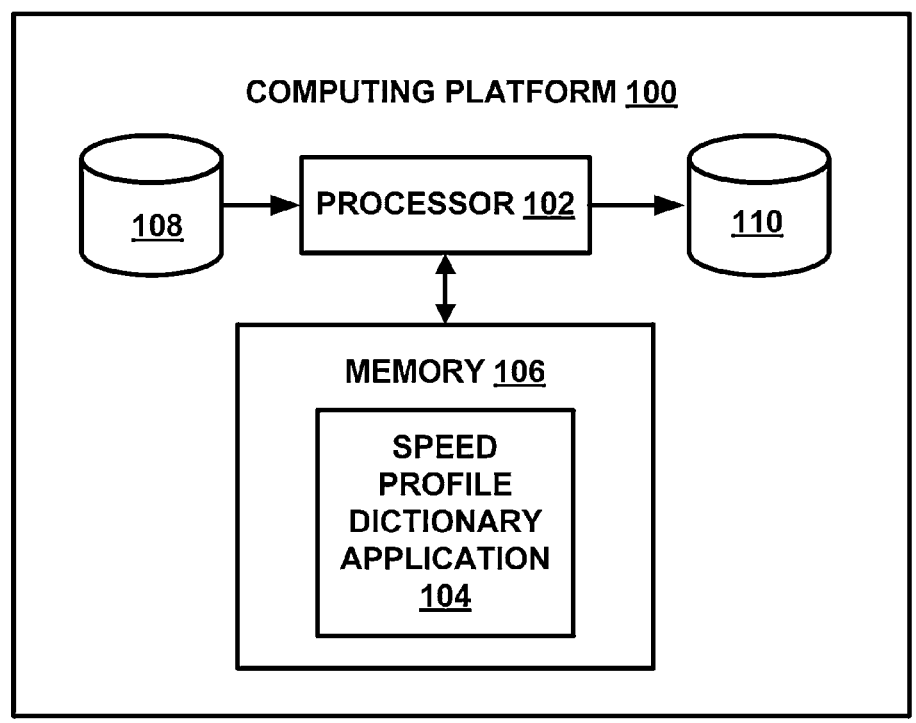
FIG. 1 is a block diagram of a computing platform for generating a speed profile dictionary, according to an example.

FIG. 1 is a block diagram of a computing platform 100 that includes hardware and software. The computing platform 100 may be a server, a personal computer (PC), a plurality of computers coupled together for parallel computing applications, or any other computer or computer system. The computing platform 100 includes a processor 102 that is operable to execute a speed profile dictionary (SPD) application 104 stored in computer-readable storage memory 106. The computer-readable storage memory 106 may be located within the computing platform 100 as shown in FIG. 1. Alternatively, the computer-readable storage memory 106 may be located external to the computing platform 100, such as on a flash drive or a CD-ROM disc, which is accessed by the computing platform 100 when the memory 106 is connected to computing platform 100.

The SPD application 104 generates speed profiles based on historic traffic data stored in a first data store 108. The SPD application 104 then associates the generated speed profiles with a cluster identifier to create a speed profile dictionary. The SPD application 104 also generates one or more lookup tables that associates location data and time periods with the cluster identifiers. The processor 102 then stores the speed profile dictionary and the lookup tables in a second data store 110.

The data stores 108, 110 include data organized in a data structure and stored in memory, such as ROM, RAM, and flash memory. While FIG. 1 depicts the data stores 108, 110 as being on the computing platform 100, it is understood that one or both of the data stores 108, 110 may be stored elsewhere and be accessible to the computing platform 100. Additionally, the data stores 108, 110 may be divided into more than two data stores.

Figure 2:
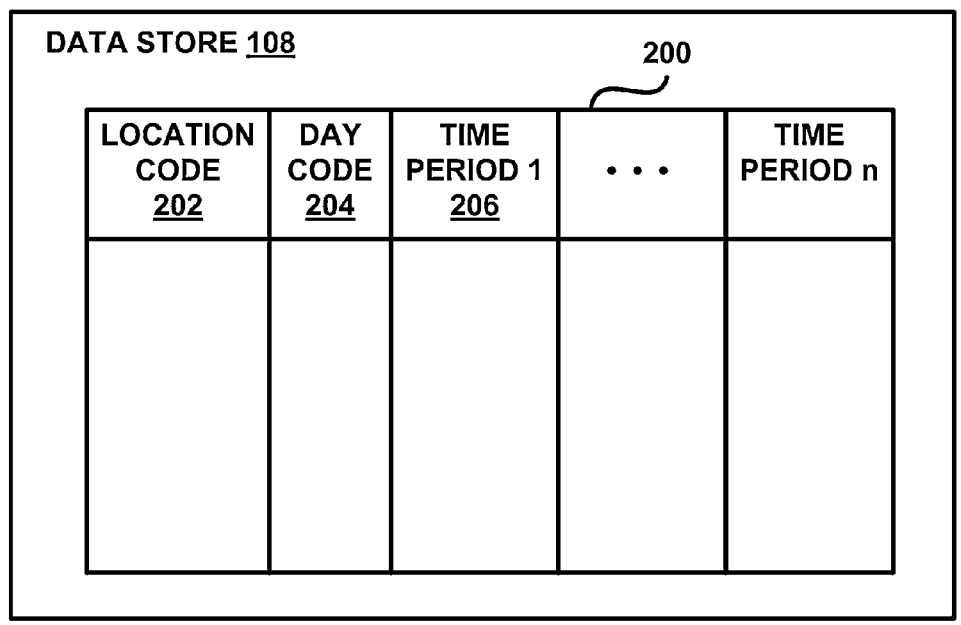
FIG. 2 is an example input of the speed profile dictionary application depicted in FIG. 1.

FIG. 2 is an example input to the SPD application 104 depicted in FIG. 1. The example depicted in FIG. 2 is a table 200 that may be stored in the first data store 108. Other data structures may be used for organizing and storing the input data. Additionally, other types of data may be included in the input data.

The table 200 includes a location code attribute 202. The location code attribute 202 includes data associated with location information. The location information may include geographical coordinates (e.g., latitude, longitude, and altitude), traffic codes (e.g., Radio Data System Traffic Message Channel (RDS-TMC) codes and Vehicle Information and Communication System (VICS) codes), road segment identifications, grid or tile identifications, and/or any other method of identifying a physical location on or adjacent to a road network in the real world.

The table 200 also includes a day code attribute 204. The day code attribute 204 includes data associated with days of the week and other days of interest. For example, the days of the week may be represented numerically (e.g., Sunday=1, . . . . Saturday=7). As another example, the other days of interest may be assigned numerical codes, such as 100=Thanksgiving, 200=Easter Sunday, and so on. Other coding schemes may also be used to identify days of the week and other days of interest.

Additionally, the day code attribute 204 may identify other conditions that may impact travel times. For example, the day code attribute 204 may include data associated with weather conditions, such as rain, snow, and wind. As another example, the day code attribute 204 may include data associated with road conditions, such as lane closures.

The table 200 also includes one or more time period attributes 206. The time period attributes 206 includes data associated with a speed value for a period of time. For example, the period of time may be fifteen minutes. In this example, there are ninety-six time periods, each associated with a speed value. Other time period durations may also be used. The speed value may be a number representing an average speed (e.g., miles per hour (MPH), kilometers per hour (KPH)) for the time period measured at the associated location. The speed value may also represent other values, such as the median speed for the time period measured at the associated location.

Figure 3:
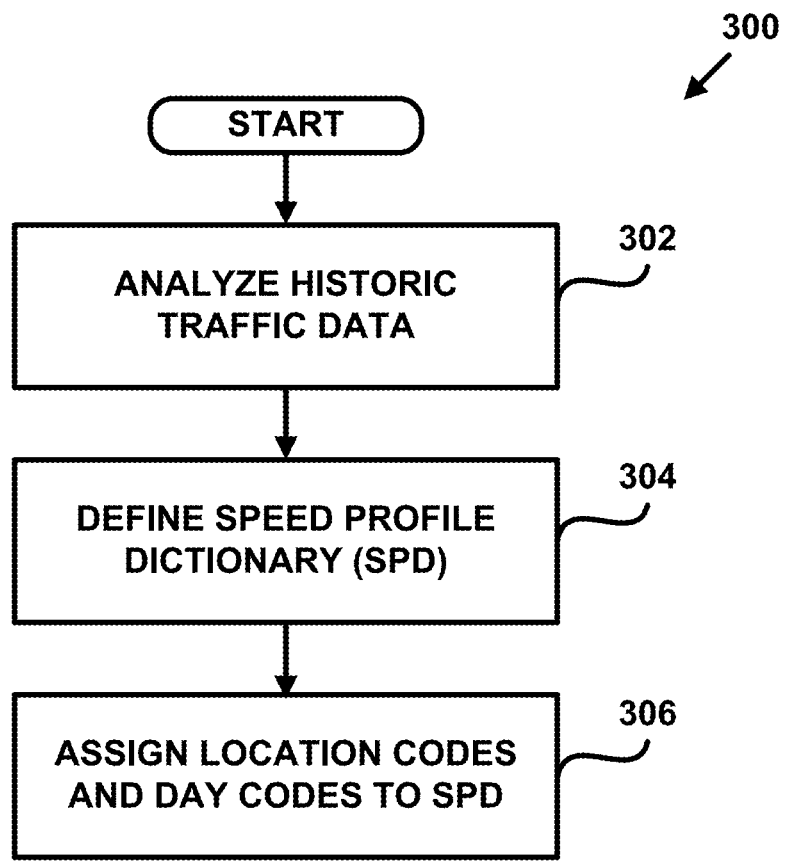
FIG. 3 is a flow chart of a method for generating a speed profile dictionary and associated lookup tables, according to an example.

FIG. 3 is a flow chart of a method 300 for generating a speed profile dictionary and associated lookup tables using the data stored in the first data store 108. The method 300 may include organizing the historic traffic data as depicted in FIG. 2 if not already in this format. The method 300 may include additional steps not depicted in FIG. 3 as well.

At block 302, the SPD application 104 analyzes the historic traffic data stored in the first data store 108. Preferably, a cluster analysis is performed on the historic traffic data. Clustering is a statistical analysis technique that analyzes the distribution of data over multiple dimensions and attempts to organize the data into "like" groupings. However, other (supervised or unsupervised) analytical techniques may be used. For example, Fuzzy c-means, hierarchical, Self Organizing Tree Algorithm (SOTA), and other neural network approaches may be used. An example analysis is described with respect to FIG. 4.

Figure 4:
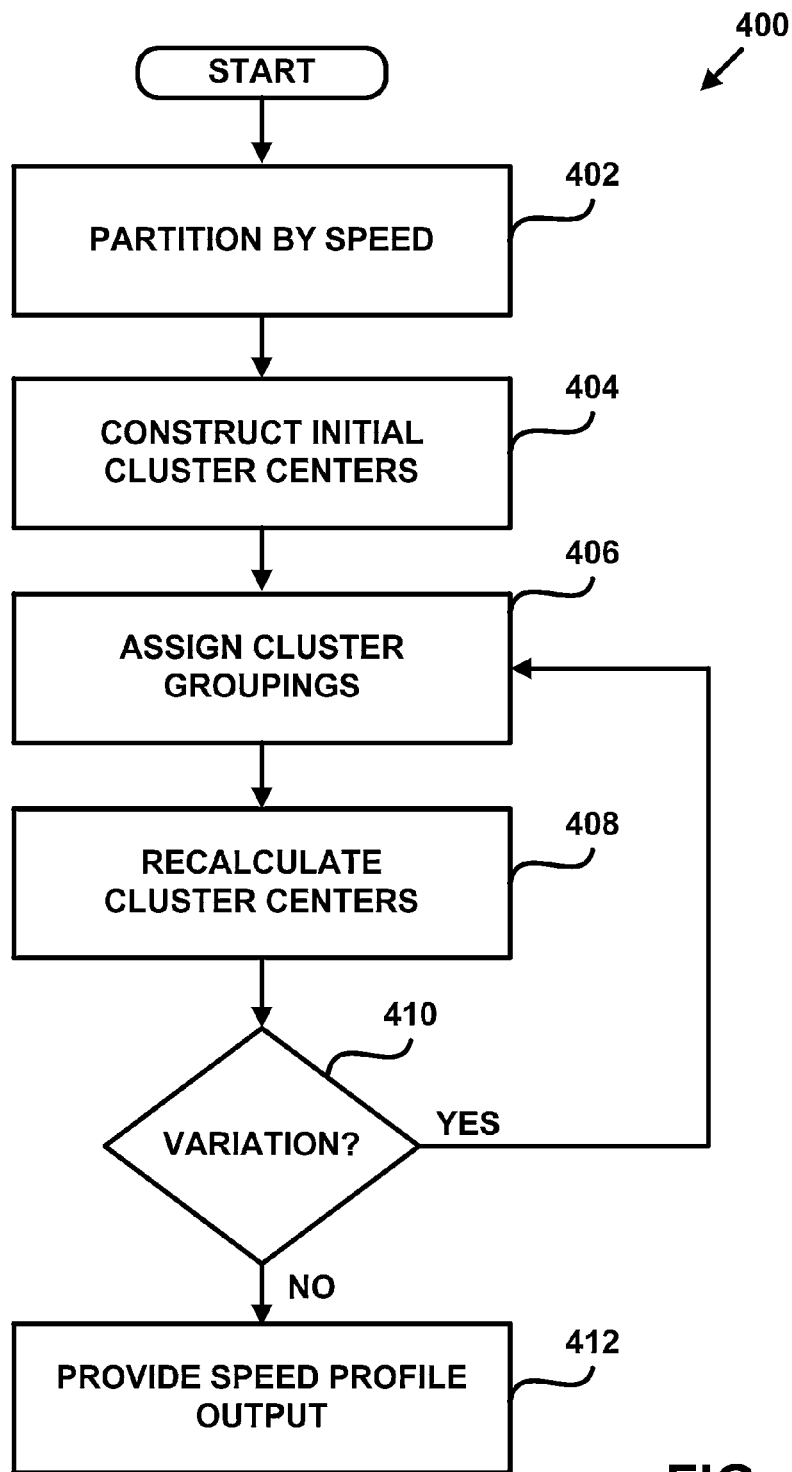
FIG. 4 is a flow chart of a method of analyzing historic traffic data, according to an example.

FIG. 4 is a flow chart of a method 400 of analyzing historic traffic data stored in the first data store 108. The method 400 uses k-means clustering. K-means clustering works well with large datasets, such as the historic traffic data. In one example, the SPD application 104 may use analytic software sold by SPSS Inc. to analyze the historic traffic data. However, other algorithms and/or software programs may be used in the method 400.

At block 402, the SPD application 104 partitions the historic traffic data stored in the data store 108 into speed groups referred to herein as speed buckets. For example, the historic speed data may be grouped into 5 KPH speed buckets. In this example, the partitions are based on multiples of five and include speeds that are +/−2.5 KPH. The partitioning may ensure that a given location code's overnight speed is consistent among different days of the week.

The speed buckets are clustered separately based on the number of location codes present in each partition. The number of clusters targeted for each partition may be obtained using the following formula, where LC=location code and Target is the target output of clusters.

Number of clusters=(partition LC count/total LC count)*Target+2

At block 404, the SPD application 104 constructs initial cluster centers. The initial cluster centers may be predetermined or be randomly selected. For example, initially the cluster centers may be randomly selected. Over time, the initial cluster centers may be predetermined based on the previous results of the method 400.

At block 406, the SPD application 104 assigns cluster groupings based on a distance to the cluster centers. Location codes are assigned to the closest cluster center. At block 408, the SPD application 104 recalculates cluster centers based on the location codes assigned to the cluster. This process of assigning location codes to cluster centers and then recalculating new cluster center locations continues based on the determination at block 410.

At block 410, the SPD application 104 determines whether there is a variation in the cluster centers. For example, if the cluster centers did not move after the last cluster center recalculation, there is no variation. Additionally or alternatively, if the cluster centers moved slightly (e.g., below a threshold amount) or are oscillating between two locations, the SPD application 104 may determine that there is no variation in the cluster centers. If there is a variation, the SPD application 104 returns to block 406. Otherwise, at block 412, the SPD application 104 outputs speed profiles, which are used at block 304 of the method 300.

Additionally or alternatively, at block 410, the SPD application 104 may determine whether a predetermined number of iterations have occurred. For example, the predetermined number of iterations may be 100. If the predetermined number of iterations has not been reached, the SPD application 104 returns to block 406. Otherwise, at block 412, the SPD application 104 outputs speed profiles, which are used at block 304 of the method 300.

Figure 5:
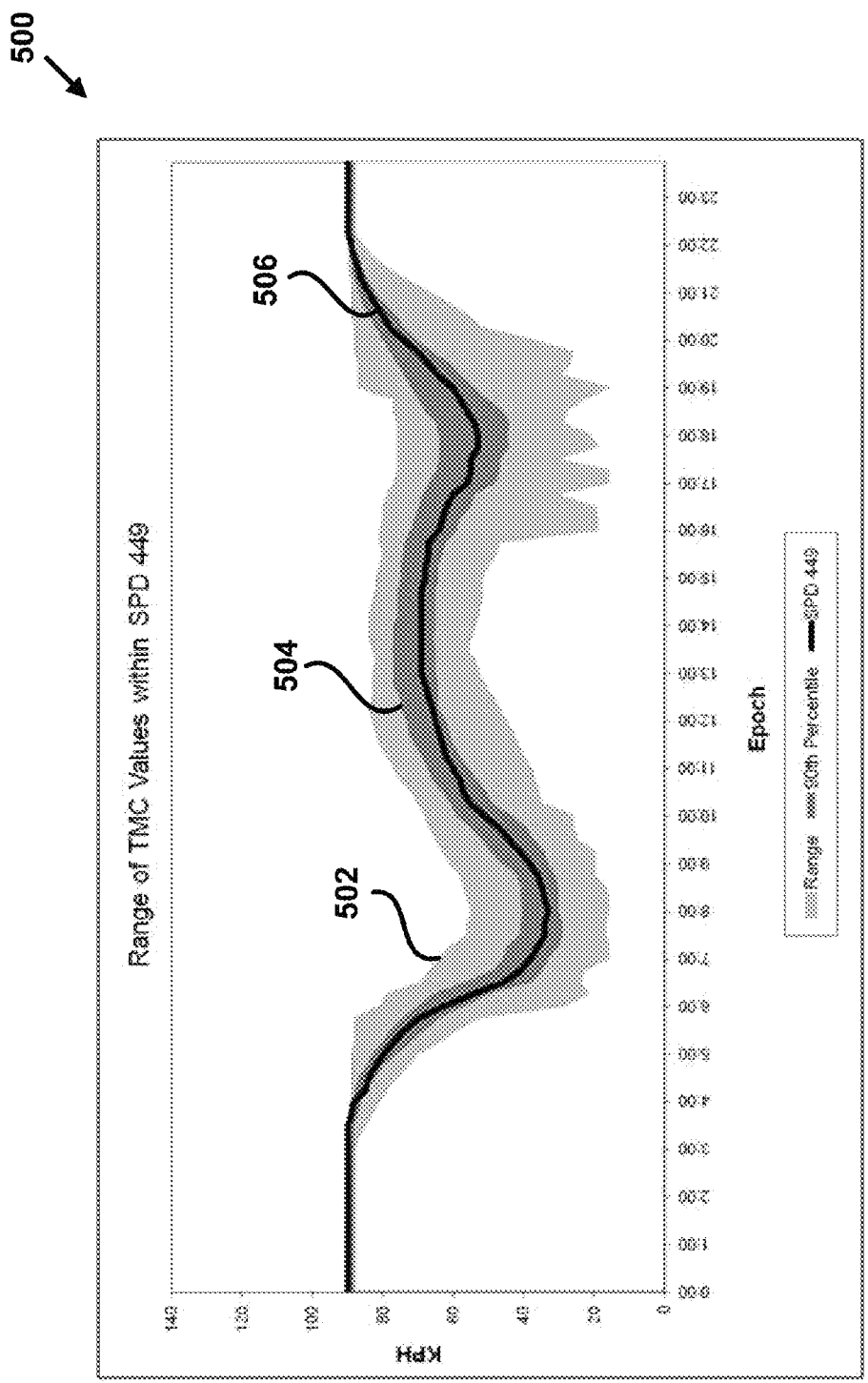
FIG. 5 is a graph that depicts example statistics for a speed profile.
Figure 6:
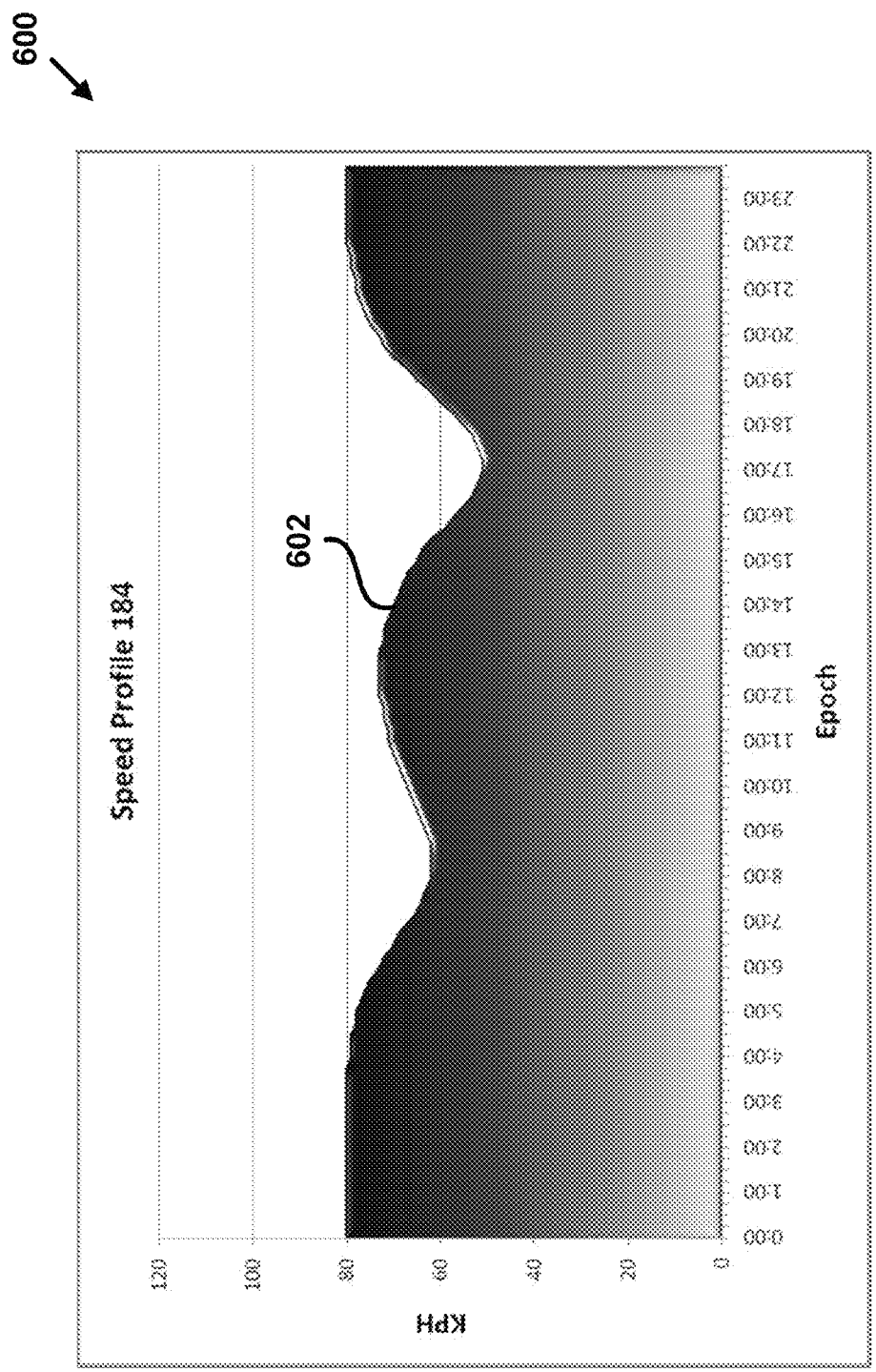
FIG. 6 is a graph that depicts an example speed profile.

Returning to FIG. 3, at block 304 the SPD application 104 defines a speed profile dictionary using the speed profiles generated by analyzing the historic traffic data at block 302. The SPD application 104 collects location codes 202 for each cluster and generates statistics for each time period 206 (epoch). FIG. 5 is a graph 500 that depicts example statistics for a speed profile. The graph 500 depicts the range of values 502, the ninetieth (90$^{th}$) percentile 504, and the defined speed profile 506. In this example, the speed profile 506 is defined as the mean speed value. FIG. 6 is a graph 600 that depicts an example speed profile 602. The speed profile 602 is defined as the speed values in time period 206 order, which comprises an entire day speed pattern for a given location code 202.

The speed profiles are combined if similar to ensure that the profiles have a unique shape. Similar profiles may be identified by performing a least squares error analysis using the following equation, where d represents the deviation between speeds for a given epoch.

$$\text{Minimum Least Squares Error} = d_1^2 + d_2^2 + \ldots + d_{n-1}^2 + d_n^2$$
$$= \sum_{i=1}^{n} d_i^2$$
$$= \sum_{i=1}^{n} [y_i - f(x_i)]^2$$

Each unique speed profile is assigned a cluster identifier for referencing purposes.

At block 306, the SPD application 104 assigns location codes and day codes to the speed profiles defined at block 304. FIG. 7 depicts a portion of an example speed profile dictionary 700 and a portion of an example speed profile dictionary lookup table 702. FIG. 7 is an example output of the SPD application 104 depicted in FIG. 1, which may be stored in the data store 110.

The speed profile dictionary 700 organizes speed profiles by the assigned cluster identifier. The speed profile dictionary 700 may include any number of speed profiles. For example, the speed profile dictionary may have 500-1000 different clusters to provide a good range of profiles with minimal loss of accuracy.

The speed profile dictionary lookup table 702 identifies a corresponding speed profile by location and day using the cluster identifier from the speed profile dictionary 700. In the example depicted in FIG. 7, the cluster identifier #5 is assigned to location code 5918, Monday through Friday. While the lookup table 702 uses TMC codes, it is understood that any location referencing scheme may be used. Additionally, more than one lookup table may be created. For example, there may be separate tables for holidays, special days, and/or bad traffic days due to weather, lane closures, and so on.

An application using historic traffic data, such as a routing application, may use the speed profile dictionary 700 along with one or more lookup tables 702 instead of using the entire historic traffic database. The routing application may be stored in the memory of a navigation system, a mobile telephone, a personal computer, a server connected to the Internet, or any other suitable computing platform. A user may request route guidance by providing information, such as origin, destination, departure day, departure time, arrival day, and arrival time, to the computing platform.

The routing application then calculates a route from the origin to the destination using known routing algorithms. The routing application identifies location codes associated with a physical location along the route and uses the location codes and the departure day to obtain a cluster identifier from the lookup table 702. The departure day may default to the day of the request; however, the user may specify a future date for planning a trip to occur later. The routing application obtains a speed profile from the speed profile dictionary 700 using the cluster identifier.

The routing application calculates an estimated time of travel for the route using the speed profile and provides the route and the estimated time of travel to the user. Additionally or alternatively, the routing application may calculate an estimated time of departure to arrive at a destination at the time specified by the user. Additionally or alternatively, the routing application may calculate alternative routes allowing the user to select a route that meets his requirements (e.g., shortest distance, fastest time, no highways, least amount of traffic).

Referring back to FIG. 7, if a routing application is asked to provide route guidance along the portion of the road network assigned TMC code 5920 on a Monday, the routing application uses the lookup table 702 to obtain the speed profile identified by cluster identifier #10. Depending on the time requested for route guidance, the speed profile identifies the expected speed of travel on that portion of the road network. While this example describes using the speed profile dictionary for routing, the speed profile dictionary may be used with other applications as well.

Other benefits may be realized from using the method 300 to generate a speed profile dictionary. For example, the method 300 may be used to identify unlikely speed profiles resulting from erroneous input data and/or processing of the input data. As a result, the speed profile dictionary may provide more quality and/or consistency than a historic traffic database.

Additionally, the speed profile dictionary may be used for portions of the road network not identified in the historic traffic database. For example, speed profiles may be assigned to location codes for which there is little or no source data based on similarities with other location codes. For example, the two location codes (one associated with historic traffic data, one without) may represent the same type of road (e.g., highway), in a similar area (e.g., city center), having a similar population.

It is intended that the foregoing detailed description be regarded as illustrative rather than limiting and that it is understood that the following claims including all equivalents are intended to define the scope of the invention. For example, while the systems and methods described herein used speed data, it is understood that other traffic data may be used in similar systems and methods. The claims should not be read as limited to the described order or elements unless stated to that effect. Therefore, all embodiments that come within the scope and spirit of the following claims and equivalents thereto are claimed as the invention.

We claim:

1. A device operative to provide route guidance, the device including computer executable program code embedded in a computer readable memory and a processor coupled therewith, the computer executable program code being executable by the processor to cause the processor to:

receive a request for route guidance from a user, wherein the request includes an origin, a destination, and a day;

calculate a route from the origin to the destination;

identify at least one location code associated with a physical location along the route;

use the at least one location code and the day to select a speed profile identifier from a lookup table, the selected speed profile identifier identifying, in a speed profile dictionary separate from the lookup table, one of a unique speed profile unique to the location code or a combined speed profile comprising a combination of substantially similar speed profiles;

select, subsequent to the selection of the selected speed profile identifier, the identified unique speed profile or combined speed profile from the speed profile dictionary based on the selected speed profile identifier;

calculate an estimated time of travel for the route using the speed profile; and provide the route and the estimated time of travel to the user.

2. The device of claim 1 wherein the device comprises a navigation system, a mobile telephone, a personal computer or a server.

3. The device of claim 1, wherein the departure day is based on the day that the device receives the user's request for route guidance.

4. The device of claim 1, wherein the day comprise an arrival day and time, the computer executable program code being further executable by the processor to cause the processor to calculate an estimated time of departure to arrive at the received arrival day and time.

5. The device of claim 1, wherein the unique speed profile and/or each of the substantially similar speed profiles were determined using clustering.

6. The device of claim 4, wherein the computer executable program code is further executable by the processor to cause the processor to provide the estimated time of departure to the user.

7. The device of claim 6, wherein the day comprises a departure day, a departure time, an arrival day, an arrival time, or a combination thereof.

8. The device of claim 1 wherein the computer program code is further executable by the processor to cause the processor to calculate at least one other route different from the calculated route and provide the at least one other route to the user.

9. The device of claim 8 wherein the at least one other route is characterized by shorter distance, faster time of travel, least amount of traffic, exclusion of highways, or a combination thereof, than the calculated route.

10. The device of claim 1 wherein the at least one location code is associated with a physical location for which there is limited historic traffic data, the at least one location code being associated in the lookup table with a speed profile identifier identifying, in the speed profile dictionary, a combined speed profile comprising a combination of substantially similar speed profiles combined based on similarities with other location codes.

11. A device operative to provide route guidance, the device comprising:

a processor and a memory coupled therewith;

a routing application stored in the memory and executable by the processor to cause the processor to receive a request for route guidance, wherein the request includes an origin, a destination, and a day, calculate a route from the origin to the destination, identify at least one location code associated with a physical location along the route, use the at least one location code and the day to select a speed profile identifier from a lookup table, the selected speed profile identifier identifying, in a speed profile dictionary separate from the lookup table, one of a unique speed profile unique to the location code or a combined speed profile comprising a combination of substantially similar speed profiles, select, subsequent to the selection of the selected speed profile identifier, the identified unique speed profile or combined speed profile from the speed profile dictionary using the selected speed profile identifier, calculate an estimated time of travel for the route using the speed profile, and provide the route and the estimated time of travel.

12. The device of claim 11, wherein the device comprises a navigation system, a mobile telephone, a personal computer or a server.

13. The device of claim 11, wherein the departure day is based on the day that the device receives the request for route guidance.

14. The device of claim 11, wherein the day comprises an arrival day and time, the routing application being further executable by the processor to cause the processor to calculate an estimated time of departure to arrive at the received arrival day and time.

15. The device of claim 14, wherein the routing application is further executable by the processor to cause the processor to provide the estimated time of departure to the user.

16. The device of claim 15, wherein the day comprises a departure day, a departure time, an arrival day, an arrival time, or a combination thereof.

17. The device of claim 11 wherein the routing application is further executable by the processor to cause the processor to calculate at least one other route different from the calculated route and provide the at least one other route.

18. The device of claim 17 wherein the at least one other route is characterized by shorter distance, faster time of travel, least amount of traffic, exclusion of highways, or a combination thereof, than the calculated route.

19. The device of claim 11 wherein the at least one location code is associated with a physical location for which there is limited historic traffic data, the at least one location code being associated in the lookup table with a speed profile identifier identifying, in the speed profile dictionary, a combined speed profile comprising a combination of substantially similar speed profiles combined based on similarities with other location codes.

20. A computer implemented method for providing route guidance by a device comprising a processor, the method comprising:

identifying, by the processor, at least one location code associated with a physical location along a route calculated based on a specified origin and destination;

using, by the processor, the at least one location code and a specified day to select a speed profile identifier from a lookup table stored in a memory coupled with the processor, the selected speed profile identifier identifying, in a speed profile dictionary stored in the memory separate from the lookup table, one of a unique speed profile unique to the location code or a combined speed profile comprising a combination of substantially similar speed profiles;

selecting, by the processor from the memory subsequent to the selection of the selected speed profile identifier, the identified unique speed profile or combined speed profile from the speed profile dictionary based on the selected speed profile identifier for use in calculating an estimated time of travel for the route.

* * * * *